United States Patent
Komatsu et al.

(10) Patent No.: US 10,069,162 B2
(45) Date of Patent: Sep. 4, 2018

(54) FUEL CELL

(71) Applicant: NGK SPARK PLUG CO., LTD., Aichi (JP)

(72) Inventors: Daisuke Komatsu, Aichi-ken (JP); Takafumi Shichida, Aichi-ken (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 72 days.

(21) Appl. No.: 14/765,422

(22) PCT Filed: Feb. 5, 2014

(86) PCT No.: PCT/JP2014/052653
§ 371 (c)(1),
(2) Date: Aug. 3, 2015

(87) PCT Pub. No.: WO2014/123148
PCT Pub. Date: Aug. 14, 2014

(65) Prior Publication Data
US 2015/0380744 A1 Dec. 31, 2015

(30) Foreign Application Priority Data

Feb. 7, 2013 (JP) ................................. 2013-022357

(51) Int. Cl.
*H01M 8/02* (2016.01)
*H01M 8/04* (2016.01)
(Continued)

(52) U.S. Cl.
CPC ......... *H01M 8/241* (2013.01); *H01M 8/0258* (2013.01); *H01M 8/0297* (2013.01);
(Continued)

(58) Field of Classification Search
CPC ............. H01M 8/0258; H01M 8/0297; H01M 8/04201; H01M 8/2425; H01M 8/2465; H01M 2008/1293
See application file for complete search history.

(56) References Cited

U.S. PATENT DOCUMENTS

| 2004/0101742 A1* | 5/2004 | Simpkins | H01M 8/0232 |
| | | | 429/468 |
| 2006/0286431 A1* | 12/2006 | Chyou | H01M 8/0258 |
| | | | 429/490 |

(Continued)

FOREIGN PATENT DOCUMENTS

| CN | 101043084 | 9/2007 |
| CN | 101312248 | 11/2008 |

(Continued)

OTHER PUBLICATIONS

International Search Report for PCT/JP2014/052653, dated Mar. 25, 2014, along with an English-language translation thereof.

(Continued)

*Primary Examiner* — Stewart A Fraser
(74) *Attorney, Agent, or Firm* — Greenblum & Bernstein, P.L.C.

(57) ABSTRACT

A fuel cell according to one mode includes a plate-like interconnector having a front surface and a back surface; a single cell having a power generation function; a gas chamber provided between the interconnector and the single cell; and one or more gas inlet ports for causing a fuel gas to flow into the gas chamber, the fuel cell further including a buffer chamber provided between the gas inlet ports and the gas chamber; a flow direction changing portion provided between the buffer chamber and the gas chamber so as to be located corresponding to the gas inlet ports, the flow direction changing portion having at least one of a front surface and a back surface, and a side surface; and a fuel gas path (Continued)

provided on at least one of the front surface side and the back surface side of the flow direction changing portion.

4 Claims, 12 Drawing Sheets

(51) Int. Cl.
  *H01M 8/241*  (2016.01)
  *H01M 8/2483*  (2016.01)
  *H01M 8/2457*  (2016.01)
  *H01M 8/2425*  (2016.01)
  *H01M 8/2465*  (2016.01)
  *H01M 8/0297*  (2016.01)
  *H01M 8/04082*  (2016.01)
  *H01M 8/0258*  (2016.01)
  *H01M 8/124*  (2016.01)

(52) U.S. Cl.
  CPC ..... *H01M 8/04201* (2013.01); *H01M 8/2425* (2013.01); *H01M 8/2457* (2016.02); *H01M 8/2465* (2013.01); *H01M 8/2483* (2016.02); *H01M 2008/1293* (2013.01)

(56) References Cited

U.S. PATENT DOCUMENTS

| | | | |
|---|---|---|---|
| 2008/0113243 A1* | 5/2008 | Kawashima | H01M 4/8636 429/444 |
| 2008/0292941 A1 | 11/2008 | Oda et al. | |
| 2009/0023045 A1 | 1/2009 | Ohmori et al. | |
| 2009/0214929 A1* | 8/2009 | Gao | H01M 8/0258 429/457 |
| 2010/0316924 A1 | 12/2010 | Sugiura et al. | |
| 2011/0053031 A1 | 3/2011 | Kojima et al. | |
| 2012/0107714 A1* | 5/2012 | Day | H01M 8/0273 429/457 |
| 2013/0130144 A1* | 5/2013 | Todo | H01M 8/0258 429/456 |
| 2014/0170522 A1 | 6/2014 | Hotta et al. | |

FOREIGN PATENT DOCUMENTS

| | | | |
|---|---|---|---|
| CN | 201536130 | 7/2010 | |
| JP | 59033763 A * | 2/1984 | |
| JP | 10-21944 | 1/1998 | |
| JP | 2009-48997 | 3/2009 | |
| JP | 2010-287474 | 12/2010 | |
| JP | 2011-54404 | 3/2011 | |
| JP | 2013-55042 | 3/2013 | |
| JP | 5346402 | 8/2013 | |
| WO | WO 2011148769 A1 * | 12/2011 | H01M 8/0258 |

OTHER PUBLICATIONS

Chinese Office Action for CN App. No. 201480008029.2 dated Aug. 22, 2016, along with English-language translation thereof.

* cited by examiner

FUEL CELL

CROSS REFERENCE TO RELATED APPLICATIONS

This is a U.S. National Stage Application under 35 USC § 371 of international application PCT/JP2014/052653 filed Feb. 5, 2014, which claims priority to Japanese Patent Application No. 2013-022357 filed Feb. 7, 2013 in the Japanese Patent Office, which is incorporated herein by reference in its entirety.

TECHNICAL FIELD

The present invention relates to a fuel cell.

BACKGROUND ART

There has been known a solid oxide fuel cell employing a solid electrolyte (solid oxide) (hereinafter the battery may be referred to as an "SOFC"). Such an SOFC employs a single cell which is formed of a solid electrolyte layer, an anode provided on one surface of the electrolyte layer, and a cathode provided on the other surface of the electrolyte layer. A fuel gas (e.g., hydrogen) and an oxidant gas are supplied to the anode and the cathode, respectively, and these gases are caused to react with each other, whereby the single cell generates electric power.

There has been disclosed a technique for supplying a fuel gas uniformly so as to achieve reliable electric power generation (see Patent Document 1). In this technique, an inlet buffer portion is provided on the upstream side of a fuel gas path, and a fuel gas inlet communication hole and the inlet buffer portion are connected by means of a plurality of inlet communication paths.

PRIOR ART DOCUMENT

Patent Document

Patent Document 1: Japanese Patent Application Laid-Open (kokai) No. 2011-054404

SUMMARY OF THE INVENTION

Problems to be Solved by the Invention

However, the technique described in Patent Document 1 is not necessarily satisfactory in terms of uniform power generation efficiency. Specifically, the pressure at the gas inlet port of the inlet buffer portion is higher than that at a position away from the inlet port; i.e., pressure distribution is not uniform. Non-uniform pressure distribution may cause non-uniform gas diffusion in a power generation region, resulting in non-uniform power generation efficiency. Therefore, in-plane temperature distribution may become non-uniform in the single cell, resulting in damage to, for example, the single cell due to thermal stress.

An object of the present invention is to provide a fuel cell which readily achieves uniform fuel gas pressure distribution, and realizes uniform gas diffusion in a power generation region.

Means for Solving the Problems (1) One mode of the present invention is a fuel cell comprising a plate-like interconnector having a front surface and a back surface; a single cell having a power generation function; a gas chamber provided between the interconnector and the single cell; and one or more gas inlet ports for causing a fuel gas to flow into the gas chamber, the fuel cell further comprising a buffer chamber provided between the gas inlet port(s) and the gas chamber; a flow direction changing portion provided between the buffer chamber and the gas chamber so as to be located at a position corresponding to the gas inlet port(s), the flow direction changing portion having at least one of a front surface and a back surface, and a side surface; and a fuel gas path provided on at least one of the front surface side and the back surface side of the flow direction changing portion.

The fuel battery has the flow direction changing portion, which is provided between the buffer chamber and the gas chamber so as to be located at a position corresponding to the gas inlet port(s).

The flow direction changing portion changes the flow direction of a fuel gas flowing through the gas inlet ports, and the fuel gas flows into the gas chamber.

The fuel cell is configured so that a portion of the fuel gas flowing through the gas inlet ports into the buffer chamber is blocked by the side surface of the flow direction changing portion, and then flows into the gas chamber along the fuel gas path provided on at least one of the front surface and the back surface of the flow direction changing portion.

Therefore, uniform fuel gas pressure distribution can be achieved in the buffer chamber, and uniform gas diffusion can be attained in a power generation region.

(2) The flow direction changing portion may have one side surface which faces the gas inlet ports.

When the flow direction changing portion has one side surface which faces the gas inlet ports, pressure loss can be increased, and thus a buffering effect (i.e., uniform distribution of the gas flowing through the gas inlet ports) is improved.

In contrast, for example, in the fuel cell described in Patent Document 1, which includes an inlet buffer portion having a plurality of embossments (see paragraph 0030), satisfactory buffering effect is difficult to attain, since the separated embossments do not have one side surface which faces a plurality of gas inlet ports.

(3) The one side surface may be generally perpendicular to the flow direction of a fuel gas flowing through the gas inlet ports.

When the one side surface is generally perpendicular to the flow direction of the fuel gas, pressure loss can be further increased, and thus a buffering effect (i.e., uniform distribution of the gas flowing through the gas inlet ports) is improved.

(4) The fuel cell may further comprise a current collector which is provided in the gas chamber and which is electrically connected to the interconnector and the single cell, wherein the gas inlet ports, the flow direction changing portion, and the current collector may be arranged substantially in a common plane.

When the gas inlet ports and the flow direction changing portion are arranged substantially in a common plane, pressure loss can be further increased, and thus a buffering effect (i.e., uniform distribution of the gas flowing through the gas inlet ports) is improved.

Meanwhile, when the gas inlet ports, the flow direction changing portion, and the current collector are arranged substantially in a common plane, the thickness of the fuel cell is readily reduced.

(5) The flow direction changing portion may be integrated with the current collector.

When the flow direction changing portion is integrated with the current collector, the number of components forming the fuel cell is reduced, and the size of the fuel cell is readily reduced.

(6) The current collector may comprise a first electrically conductive member, a spacer provided on the first electrically conductive member, and a second electrically conductive member provided on the spacer and electrically connected to the first electrically conductive member. The flow direction changing portion may be integrated with the spacer.

When the flow direction changing portion is integrated with the spacer, the number of components forming the fuel cell is reduced, and the size of the fuel cell is readily reduced.

Particularly, when the spacer itself functions as the flow direction changing portion, the number of components can be more effectively reduced.

(7) The fuel cell may comprise a frame-shaped portion, and the frame-shaped portion may have thereon the gas inlet ports.

When the frame-shaped portion having a plurality of the gas inlet ports is employed, the number of components forming the fuel cell is reduced, and the size of the fuel cell is readily reduced.

At least a portion of the frame-shaped portion may be formed of a metal.

When at least a portion of the frame-shaped portion is formed of a metal, a plurality of gas inlet ports are formed in the frame-shaped portion with improved processing accuracy, and the pressure distribution of a fuel gas flowing into the gas chamber is made more uniform, as compared with the case where the frame-shaped portion is formed of an insulation material such as mica.

(8) The flow direction changing portion may be integrated with the interconnector.

When the flow direction changing portion is integrated with the interconnector, the number of components forming the fuel cell is reduced, and the size of the fuel cell is readily reduced. In addition, a gap is readily provided in the single cell, and a fuel gas is readily supplied uniformly into the single cell.

Effects of the Invention

According to the present invention, there can be provided a fuel cell which readily realizes a reduction in contact resistance, and a method for producing the fuel cell.

MODES FOR CARRYING OUT THE INVENTION

Embodiments of the present invention will next be described in detail with reference to the drawings.

First Embodiment

Figure 1:
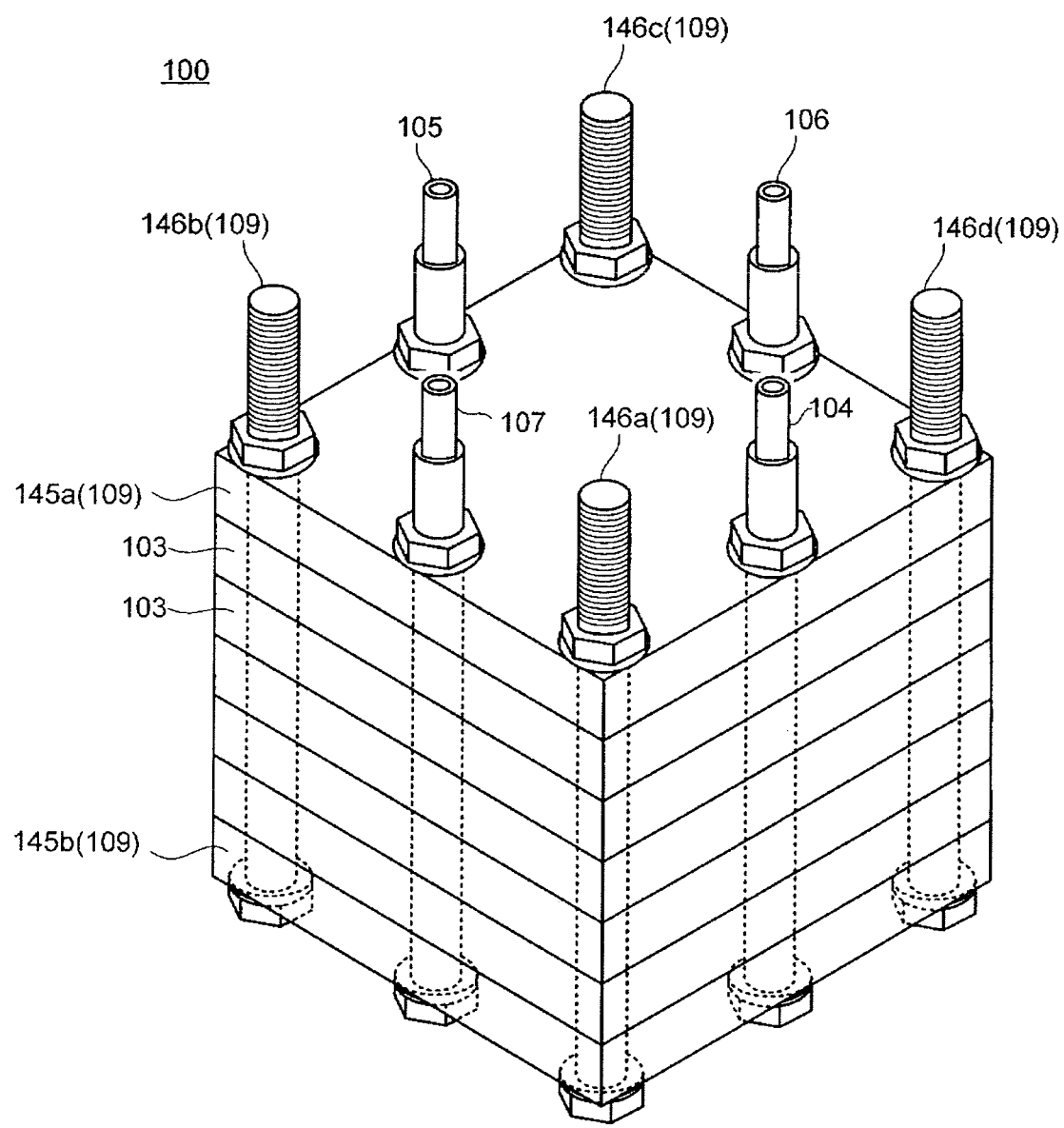
FIG. 1 is a perspective view of a fuel cell stack 100 according to a first embodiment.

FIG. 1 is a perspective view of a fuel cell stack (fuel cell) 100 according to a first embodiment. The fuel cell stack 100 includes cell units 103, an air supply path 104, an air discharge path 105, a fuel supply path 106, a fuel discharge path 107, and fixing members 109.

Figure 2:
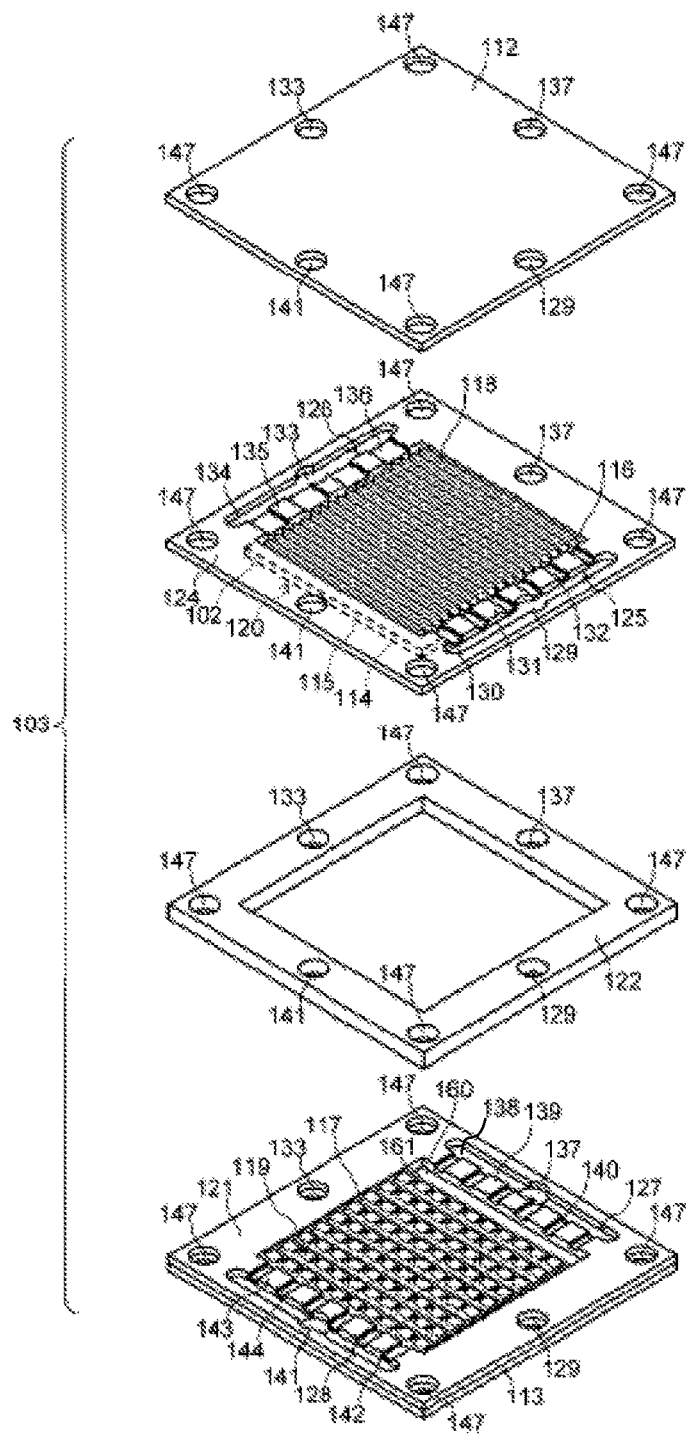
FIG. 2 is a perspective view of a cell unit 103 of the fuel cell stack 100.
Figure 3:
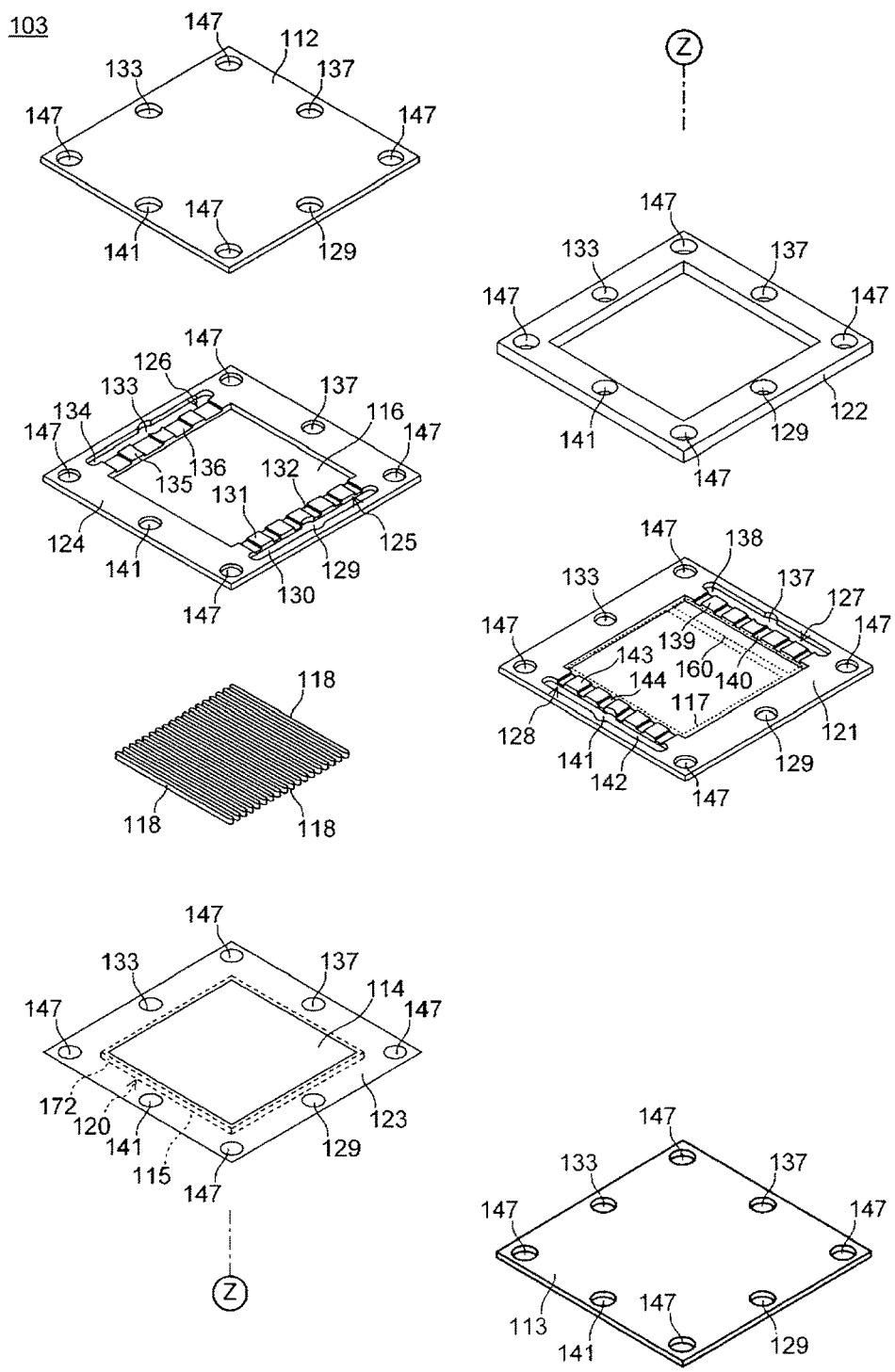
FIG. 3 is an exploded perspective view of the cell unit 103 of the fuel cell stack 100.
Figure 4:
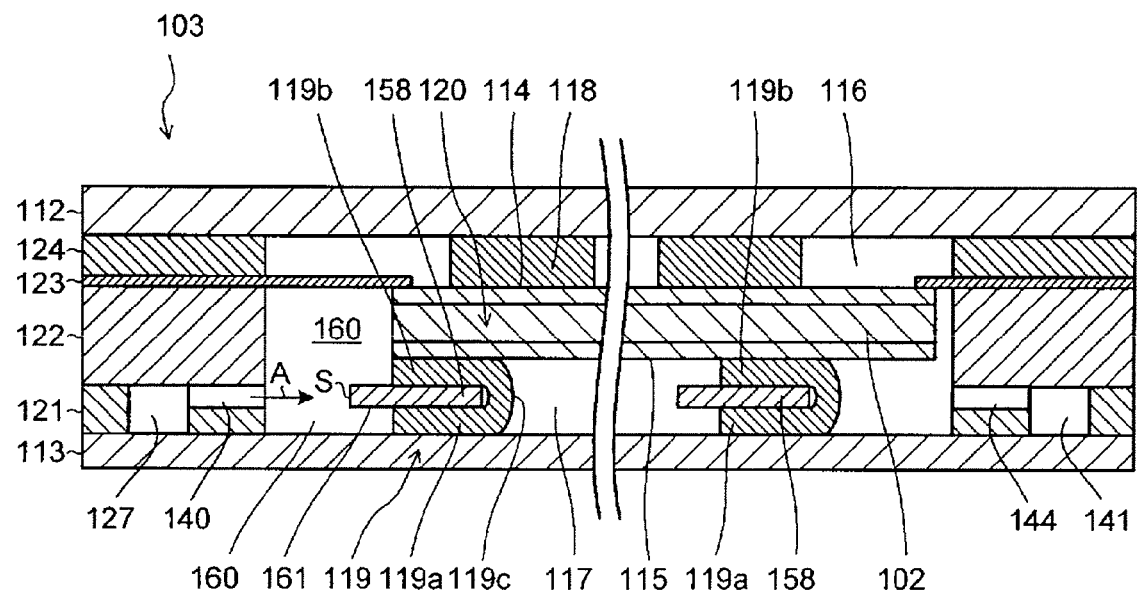
FIG. 4 is a cross-sectional view of the cell unit 103 of the fuel cell stack 100.

FIGS. 2 to 4 are respectively a perspective view, an exploded perspective view, and a cross-sectional view of each cell unit 103.

Each cell unit 103 serves as a minimum unit for power generation, and includes interconnectors 112 and 113, a single cell 120, an air chamber 116, a fuel chamber (gas chamber) 117, and current collectors 118 and 119.

The interconnectors 112 and 113 are in quadrangular plate form in plan view, and are formed of, for example, electrically conductive ferrite stainless steel. The interconnectors 112 and 113 are arranged in a vertical direction.

(Single Cell 120)

The single cell 120 is located generally at the middle between the interconnectors 112 and 113, and has an electrolyte 102, a cathode 114, and an anode 115. The cathode 114 and the anode 115 are respectively provided on the upper and lower surfaces of the electrolyte 102.

The electrolyte 102 may be formed of, for example, a $ZrO_2$ ceramic material, an $LaGaO_3$ ceramic material, a $BaCeO_3$ ceramic material, an $SrCeO_3$ ceramic material, an $SrZrO_3$ ceramic material, or a $CaZrO_3$ ceramic material.

The anode 115 may be formed of a mixture of a metal such as Ni or Fe, and at least one species selected from among ceramic materials such as $CeO_2$ ceramic materials and $ZrO_2$ ceramic materials (e.g., zirconia stabilized by at least one species selected from among rare earth elements such as Sc and Y). The anode 115 may be formed of a metal such as Pt, Au, Ag, Pb, Ir, Ru, Rh, Ni, or Fe. The anode 115 may be formed of only one species of these metals, or an alloy of two or more species of the metals. Alternatively, the anode 115 may be formed of a mixture of such a metal and/or an alloy thereof and at least one species of the aforementioned ceramic materials (the mixture including cermet). Alternatively, the anode 115 may be formed of, for example, a mixture an oxide of a metal such as Ni or Fe, and at least one species of the aforementioned ceramic materials.

The cathode 114 may be formed of, for example, any metal, any metal oxide, or any metal multiple oxide. Examples of the metal include metals such as Pt, Au, Ag, Pb, Ir, Ru, and Rh; and alloys containing two or more of these metals. Examples of the metal oxide include oxides of La, Sr, Ce, Co, Mn, Fe, and the like (e.g., $La_2O_3$, SrO, $Ce_2O_3$, $Co_2O_3$, MnO, and FeO). Examples of the multiple oxide include multiple oxides containing, for example, at least La, Pr, Sm, Sr, Ba, Co, Fe, or Mn (e.g., $L_{1-x}Sr_xCo_3$ multiple oxides, $La_{1-x}Sr_xFeO_3$ multiple oxides, $La_{1-x}Sr_xCo_{1-x}FeO_3$ multiple oxides, $La_{1-x}Sr_xMnO_3$ multiple oxides, $Pr_{1-x}Ba_x$-$CoO_3$ multiple oxides, and $Sm_{1-x}Sr_xCo_3$ multiple oxides).

(Air Chamber 116)

The air chamber 116 is provided between the interconnector 112 and the cathode 114, and is a space into which an oxidant gas is supplied. The air chamber 116 is defined by a separator 123, a cathode insulation frame 124, and the interconnector 112.

The separator 123 is an electrically conductive, thin metallic quadrangular frame-like portion, and the electrolyte 102 is attached to the lower surface of the separator 123.

The cathode insulation frame 124 is provided between the separator 123 and the upper interconnector 112, and surrounds the current collector 118.

(Fuel Chamber (Gas Chamber) 117)

The fuel chamber 117 is provided between the interconnector 113 and the anode 115, and is a space into which a fuel gas is supplied. The fuel chamber 117 is defined by combination of the interconnector 113, an anode insulation frame 121, and an anode frame 122.

The anode insulation frame 121 surrounds the current collector 119, and is provided on the lower surface of the lower interconnector 113.

The anode frame 122 is provided on the upper surface of the anode insulation frame 121.

(Buffer Chamber 160)

As shown in FIGS. 2 to 4, a buffer chamber 160 is provided between a fuel supply communication portion 140 and the current collector 119 (and the fuel chamber 117). That is, the buffer chamber 160 is a space which is defined by the interconnector 113, the anode insulation frame 121, and the anode frame 122, and in which the current collector 119 (and the anode 115) on the side toward the fuel supply communication portion (gas inlet port) 140 are not provided. The buffer chamber 160 is a space into which a fuel gas supplied through the fuel supply communication portion 140 flows. Since the fuel gas supplied through the fuel supply communication portion 140 diffuses in the buffer chamber 160, the fuel gas flows uniformly in the fuel chamber 117.

(Current Collector 118)

The current collector 118 is a connection member which is provided within the air chamber 116, and which electrically connects the cathode 114 to the upper interconnector 112.

The current collector 118 on the side toward the air chamber 116 is formed of, for example, a dense electrically conductive member having an elongated squared timber shape (e.g., a stainless steel material). A plurality of current collectors 118 are arranged in parallel at certain intervals so as to abut the cathode 114 on the upper surface of the electrolyte 102 and the lower surface (inner surface) of the upper interconnector 112. The current collector 118 on the side toward the air chamber 116 may have the same structure as the current collector 119 on the side toward the fuel chamber 117.

(Current Collector 119)

The current collector 119 is a connection member which is provided within the fuel chamber 117, and which electrically connects the fuel chamber 117 to the lower interconnector 113.

Figure 5:
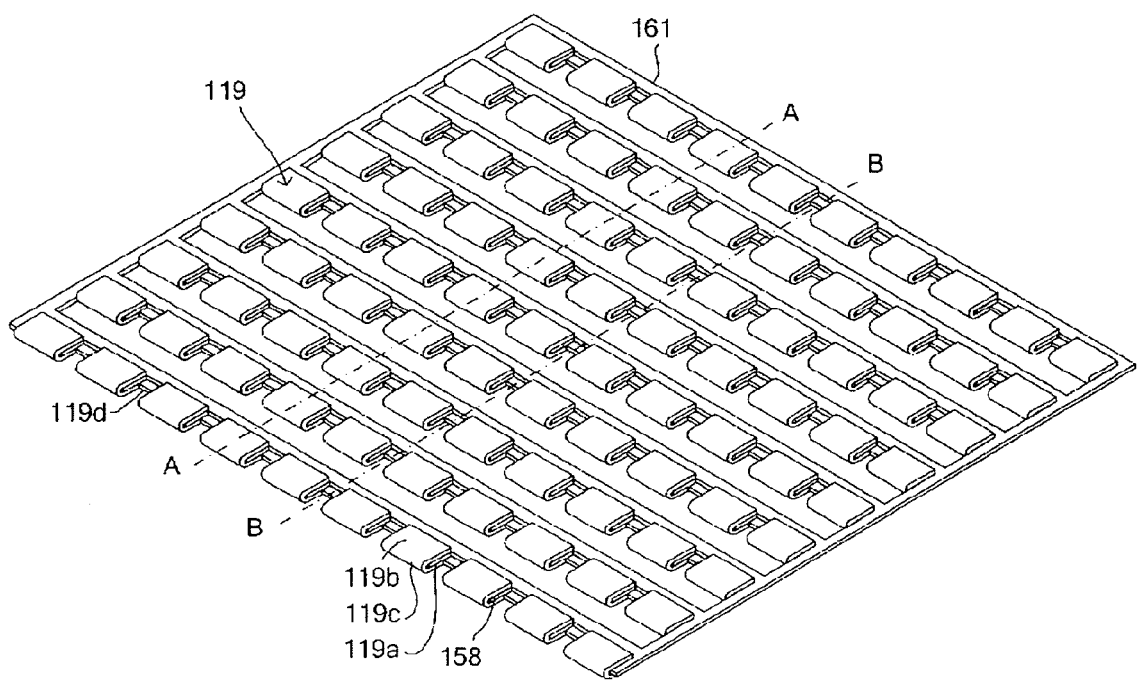
FIG. 5 is a perspective view of a current collector 119.
Figure 6:
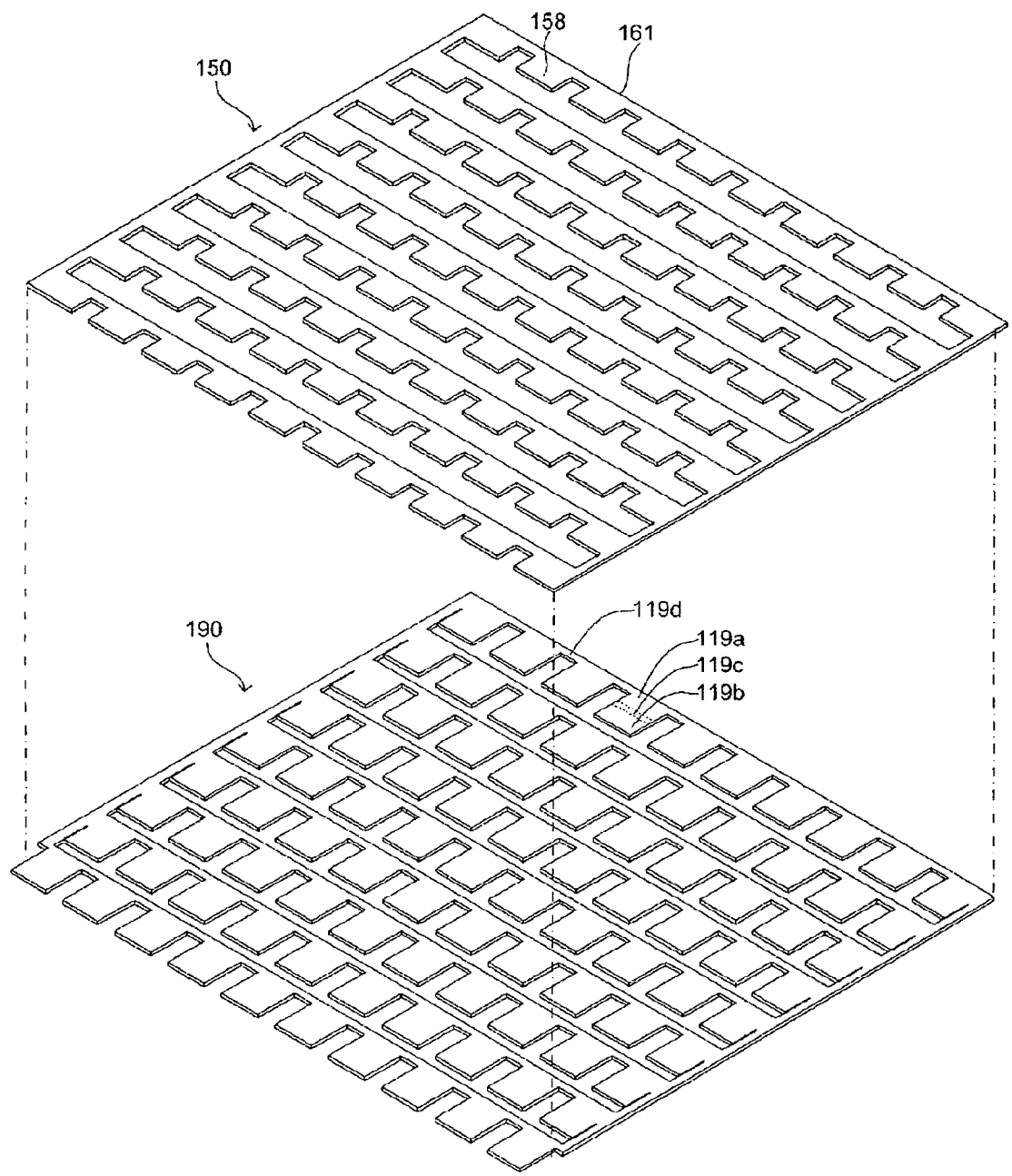
FIG. 6 is an exploded perspective view of the current collector 119.

FIGS. 5 and 6 are respectively a perspective view and an exploded perspective view of the current collector 119.

The current collector 119 is formed of combination of a flat metal member 190 and a flat insulation member 150. The current collector 119 can be formed by stacking the flat metal member 190 and the flat insulation member 150 together, and folding the flat metal member 190.

The flat metal member 190 is formed of, for example, an Ni plate material, and has a connector abutment portion (electrically conductive member) 119a, a single cell abutment portion (electrically conductive member) 119b, a communication portion 119c, and a connection portion 119d, which will be described hereinbelow. A plurality of units each including the connector abutment portion 119a, the single cell abutment portion 119b, and the communication portion 119c are connected together by means of the connection portions 119d.

The flat insulation member 150 is formed of a material which is not sintered to the flat metal member 190 at the operating temperature region of the fuel cell. The material of the flat insulation member 150 may be any of mica, alumina, vermiculite, carbon fiber, silicon carbide fiber, and silica, or may contain at least one species of these as a main component. Preferably, the flat insulation member 150 is formed of a stacking structure of thin plates (e.g., mica), since appropriate elasticity is imparted with respect to a load in a stacking direction.

The flat insulation member 150 has a spacer 158 and a flow direction changing portion 161, which will be described hereinbelow.

The current collector 119 has the connector abutment portion (electrically conductive member) 119a, the single cell abutment portion (electrically conductive member) 119b, the communication portion 119c, the spacer 158, and the flow direction changing portion 161.

The connector abutment portion (electrically conductive member) 119a abuts the interconnector 113, and the single cell abutment portion (electrically conductive member) 119b abuts the anode 115 of the single cell 120.

The communication portion 119c is a U-shaped member which connects the connector abutment portion 119a and the single cell abutment portion 119b.

The current collector 119 may be formed of, in place of a plate material, for example, porous Ni, Ni mesh, or Ni wire. Alternatively, the current collector 119 may be formed of, in place of Ni, an oxidation-resistant metal such as an Ni alloy or stainless steel.

In the fuel chamber 117 between the single cell 120 and the lower interconnector 113, the spacer 158 is provided between the connector abutment portion 119a and the single cell abutment portion 119b.

The flow direction changing portion 161 of the flat insulation member 150 is connected to the spacer 158, and projects from the current collector 119. The flow direction changing portion 161 changes the flow direction of a fuel gas flowing from the buffer chamber 160 into the fuel chamber 117, whereby the fuel gas flows uniformly in the fuel chamber 117. This phenomenon will be described in detail below.

Each cell unit 103 also includes an air supply unit 125, an air discharge unit 126, a fuel supply unit 127, and a fuel discharge unit 128.

(Air Supply Unit 125)

The air supply unit 125 includes an air supply through hole 129, an air supply communication chamber 130, a partition wall 131, an air supply communication portion 132, and the air supply path 104.

The air supply through hole 129 is provided so as to extend in a vertical direction at the center of one side of the quadrangular cell unit 103.

The air supply communication chamber 130 is an elongated-hole-shaped space which is provided in the cathode insulation frame 124 so as to communicate with the air supply through hole 129.

The partition wall 131 is provided between the air supply communication chamber 130 and the air chamber 116.

The air supply communication portion 132 is formed of a plurality of dents provided at regular intervals on the upper surface of the partition wall 131.

The air supply path 104 is inserted in the air supply through hole 129 for supplying air from the outside into the air supply communication chamber 130.

(Air Discharge Unit 126)

The air discharge unit 126 includes an air discharge through hole 133, an air discharge communication chamber 134, an air discharge communication portion 136, and the air discharge path 105.

The air discharge through hole 133 is provided so as to extend in a vertical direction at the center of the side of the cell unit 103 opposite the air supply unit 125.

The air discharge communication chamber 134 is an elongated-hole-shaped space which is provided in the cathode insulation frame 124 so as to communicate with the air discharge through hole 133.

The air discharge communicating portion 136 is formed of a plurality of dents provided at regular intervals on the upper surface of a partition wall 135 between the air discharge communication chamber 134 and the air chamber 116.

The air discharge path 105 is a tubular path which is inserted in the air discharge through hole 133 for discharging air from the air discharge communication chamber 134 to the outside.

(Fuel Supply Unit 127)

The fuel supply unit 127 includes a fuel supply through hole 137, a fuel supply communication chamber 138, a fuel supply communication portion (gas inlet port) 140, and the fuel supply path 106.

The fuel supply through hole 137 is provided so as to extend in a vertical direction at the center of one of the remaining two sides of the quadrangular cell unit 103.

The fuel supply communication chamber 138 is an elongated-hole-shaped space which is provided in the anode insulation frame 121 so as to communicate with the fuel supply through hole 137.

The fuel supply communication portion (gas inlet port) 140 is formed of a plurality of dents provided at regular intervals on the upper surface of a partition wall 139 between the fuel supply communication chamber 138 and the buffer chamber 160.

The fuel supply path 106 is a tubular path which is inserted in the fuel supply through hole 137 for supplying a fuel gas from the outside into the fuel supply communication chamber 138.

(Fuel Discharge Unit 128)

The fuel discharge unit 128 includes the fuel discharge path 107 for discharging a fuel gas from the fuel chamber 117 to the outside.

The fuel discharge unit 128 includes a fuel discharge through hole 141, a fuel discharge communication chamber 142, a partition wall 143, a fuel discharge communication portion 144, and the fuel discharge path 107.

The fuel discharge through hole 141 is provided so as to extend in a vertical direction at the center of the side of the cell unit 103 opposite the fuel supply unit 127.

The fuel discharge communication chamber 142 is an elongated-hole-shaped space which is provided in the anode insulation frame 121 so as to communicate with the fuel discharge through hole 141.

The partition wall 143 is provided between the fuel discharge communication chamber 142 and the fuel chamber 117.

The fuel discharge communication portion 144 is formed of a plurality of dents provided at regular intervals on the upper surface of the partition wall 143.

The fuel discharge path 107 is inserted in the fuel discharge through hole 141 for discharging the fuel gas from the fuel discharge communication chamber 142 to the outside.

(Fixing Member 109)

The fuel cell stack 100 is produced by fixing, by means of the fixing members 109, a cell group prepared through stacking of a plurality of the aforementioned cell units 103.

When a plurality of the cell units 103 are stacked together, the upper interconnector 112 of the cell unit 103 located on the lower side is integrated with the lower interconnector 113 of the cell unit 103 located on the lower-side cell unit 103, and the thus-integrated interconnector is shared by the upper and lower cell units 103, 103.

The fixing members 109 are a combination of a pair of end plates 145a and 145b and four clamping members 146a to 146d.

The paired end plates 145a and 145b vertically sandwich the cell group.

Each of the clamping members 146a to 146d for clamping the end plates 145a and 145b and the cell group includes a clamping nut and a bolt penetrating corner holes (not illustrated) of the end plates 145a and 145b and the aforementioned corner holes 147 of the cell group. The clamping members 146a to 146d are formed of, for example, Inconel 601.

The air supply path 104 is attached to the fuel cell stack 100 so as to vertically penetrate the through holes (not illustrated) of the end plates 145a and 145b and the air supply through holes 129 of the cell group.

(Achievement of Uniform Fuel Gas Pressure Distribution in Buffer Chamber)

In the present embodiment, the buffer chamber 160 and the flow direction changing portion 161 are provided between the fuel supply communication portion 140 and the fuel chamber 117. Therefore, pressure distribution becomes uniform in the buffer chamber 160, and the fuel gas flows uniformly in the fuel chamber 117. This phenomenon will now be described in detail.

Figure 7:
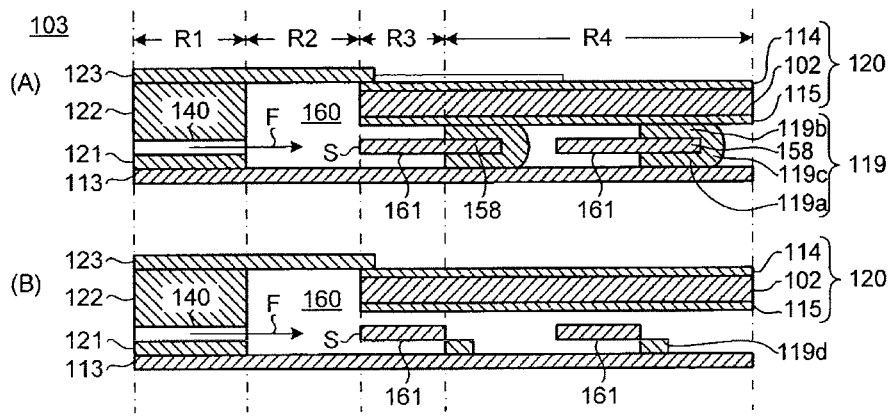
FIG. 7 is a schematic cross-sectional view of the cell unit 103 of the fuel cell stack 100.

FIG. 7 is a schematic cross-sectional view of the cell unit 103. FIG. 7(A) is a cross-sectional view of the cell unit of FIG. 5 taken along line A-A, and FIG. 7(B) is a cross-sectional view of the cell unit of FIG. 5 taken along line B-B.

The cell unit 103 has regions R1 to R4, which are determined according to the flow of a fuel gas. The regions R1 to R4 respectively correspond to the locations of the fuel supply communication portion (gas inlet port) 140, the buffer chamber 160, the flow direction changing portion 161, and the fuel chamber (gas chamber) 117.

Since a fuel gas flows into the buffer chamber 160 through a plurality of the fuel supply communication portions (gas inlet ports) 140 and diffuses in the buffer chamber 160, uniform pressure distribution is achieved in the buffer chamber 160, and the fuel gas flows uniformly in the fuel chamber 117.

The flow direction changing portion 161 is provided between the buffer chamber 160 and the fuel chamber 117 so as to correspond to a plurality of the fuel supply communication portions 140. The flow direction changing portion 161 changes the flow direction F of a fuel gas flowing into the buffer chamber 160 through a plurality of the fuel supply communication portions 140. Therefore, uniform pressure distribution can be achieved in the buffer chamber 160, and the fuel gas can flow uniformly in the fuel chamber 117.

As shown in FIGS. 7(A) and 7(B), even when a fuel gas flows through the current collector 119 in the flow direction F along any of lines A-A and B-B shown in FIG. 5, uniform pressure distribution can be achieved by means of the flow direction changing portion 161.

Specifically, the flow direction changing portion 161 has one side surface S facing a plurality of the fuel supply communication portions 140. A fuel gas flowing through the fuel supply communication portions 140 collides with the side surface S, and thus the flow direction of the fuel gas changes. When the fuel gas collides with the side surface S, pressure loss occurs, and uniform pressure distribution is achieved. When the side surface S is provided so as to face all the fuel supply communication portions 140, pressure loss can be increased, and further uniform pressure distribution can be achieved.

The side surface S is generally perpendicular to the flow direction F of a fuel gas flowing through a plurality of the fuel supply communication portions 140. The side surface S may be inclined with respect to the flow direction F. However, when the side surface S is generally perpendicular to the flow direction F, pressure loss is further increased, and further uniform pressure distribution is achieved.

In the present embodiment, a plurality of the fuel supply communication portions 140 and the flow direction changing portion 161 are arranged substantially in a common plane. Therefore, pressure loss is further increased, and further uniform pressure distribution is achieved.

In the present embodiment, the in-line spacers 158 are arranged in an irregular pattern in plan view. As shown in FIG. 6, gaps are provided between a plurality of the spacers 158 which are in-line connected by means of the flow direction changing portion 161. That is, the downstream-side ends of the in-line spacers 158 are discontinuous.

The case where the downstream-side ends of the in-line spacers 158 are continuous will be described below in modification 1.

In the present embodiment, each cell unit 103 includes a plurality of the fuel supply communication portions (gas inlet ports) 140 (and a plurality of the fuel discharge communication portions (gas outlet ports) 144). The case where each cell unit 103 includes a single fuel supply communication portion (gas inlet port) 140 (or a single fuel discharge communication portion (gas outlet port) 144) will be described below in modifications 2 to 5.

Second Embodiment

A second embodiment will next be described.

Figure 8:
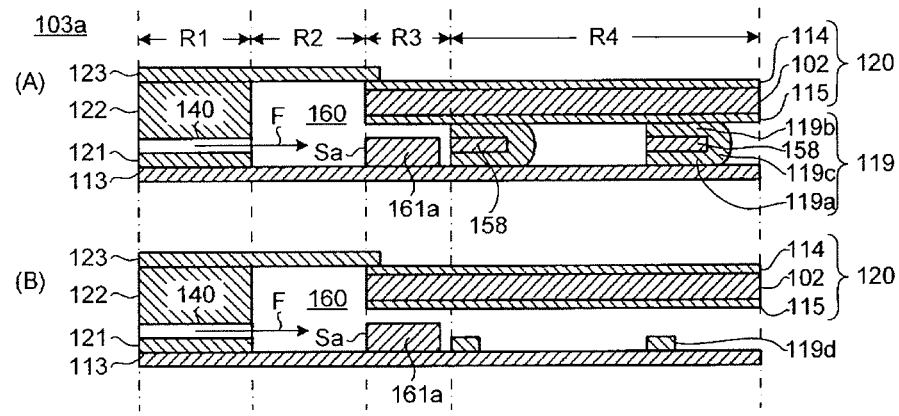
FIG. 8 is a schematic cross-sectional view of a cell unit 103a of a fuel cell stack 100a according to a second embodiment.
Figure 9:
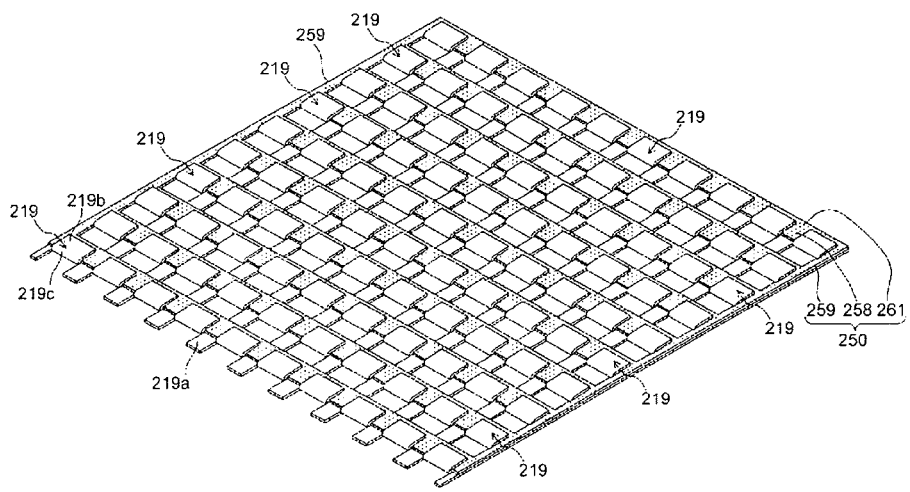
FIG. 9 is a perspective view of a current collector 219 according to modification 1.

FIG. 8 corresponds to FIG. 4 showing the first embodiment, and is a schematic cross-sectional view of a cell unit 103a of a fuel cell stack 100 according to the second embodiment.

Unlike the case of the first embodiment, in the cell unit 103a, a current collector 119 does not have a flow direction changing portion 161. A flow direction changing portion 161a is attached to an interconnector 113 or integrated with the interconnector 113.

The flow direction changing portion 161a has a thickness larger than that of the flow direction changing portion 161 of the first embodiment, and the side surface Sa of the flow direction changing portion 161 has a larger area. Therefore, and a fuel gas more reliably collides with the side surface Sa, pressure loss is further increased. Thus, further uniform pressure distribution is achieved.

Although a gap is provided between the current collector 119 and the flow direction changing portion 161a, this gap may be omitted.

Modifications 1 to 5 of the present invention will next be described.

In each of modifications 1 to 5, components of a fuel cell stack have the same configurations as those of the fuel cells of the aforementioned embodiments, and thus detailed description thereof is omitted. Specifically, the fuel cell stack has the same configuration as that shown in, for example, FIGS. 1 to 4, except for modified portions.
(Modification 1)

Figure 12:
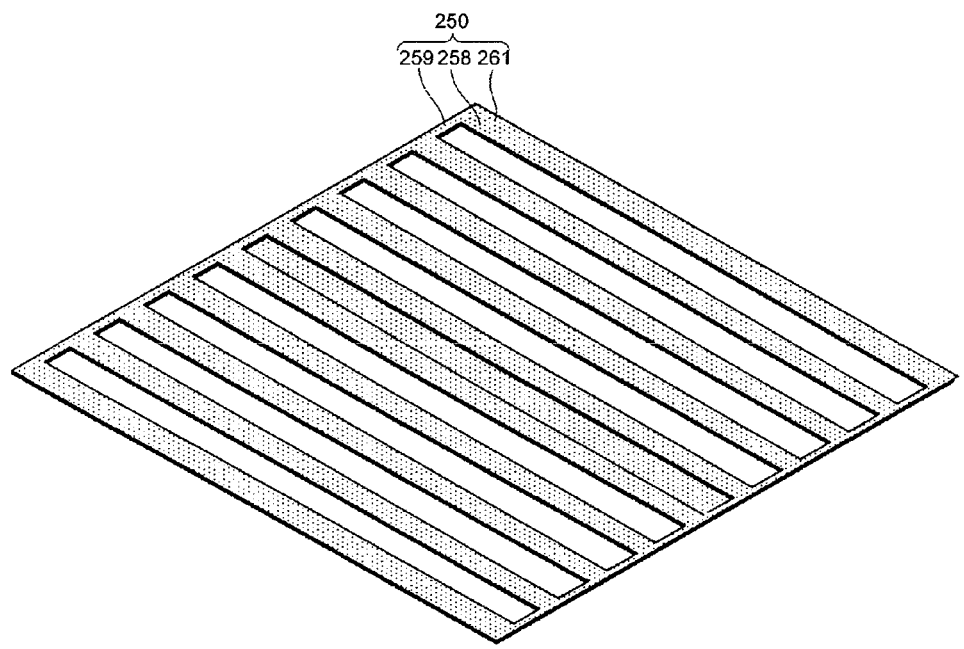
FIG. 12 is a perspective view of a flat insulation member 250 according to modification 1.

FIGS. 9 to 12 show, for example, a current collector 219 of a fuel cell stack according to modification 1. In this fuel cell stack, as shown in FIG. 12, the downstream-side ends of in-line spacers 258 are continuous.

The current collector 219 includes a flat metal member 290 and a flat insulation member 250.

The flat metal member 290 is formed by, for example, providing pre-cut lines 219e in an Ni plate material (HV hardness: 200 or less) which has been subjected to thermal treatment (annealing) under vacuum at 1,000° C. for one hour. Annealing may be preceded or followed by cutting.

Similar to the case shown in FIG. 4, the flat metal member 290 (or the current collector 219) has a connector abutment portion 219a which abuts an interconnector 113, a single cell abutment portion 219b which abuts an anode 115 of a cell main body 120, and a U-shaped communication portion 219c which connects the connector abutment portion 219a and the single cell abutment portion 219b, the portions 219a to 219c being continuously formed. By means of the elastic force of the U-shaped communication portion 219c, the connector abutment portion 219a and the single cell abutment portion 219b are respectively biased toward the interconnector 113 and the cell main body 120.

Figure 10:
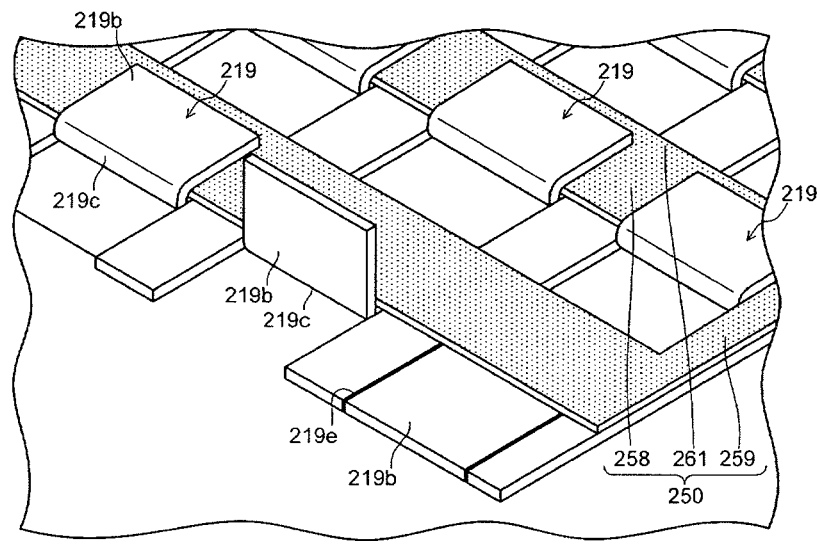
FIG. 10 is an enlarged perspective view of the current collector 219 according to modification 1.
Figure 11:
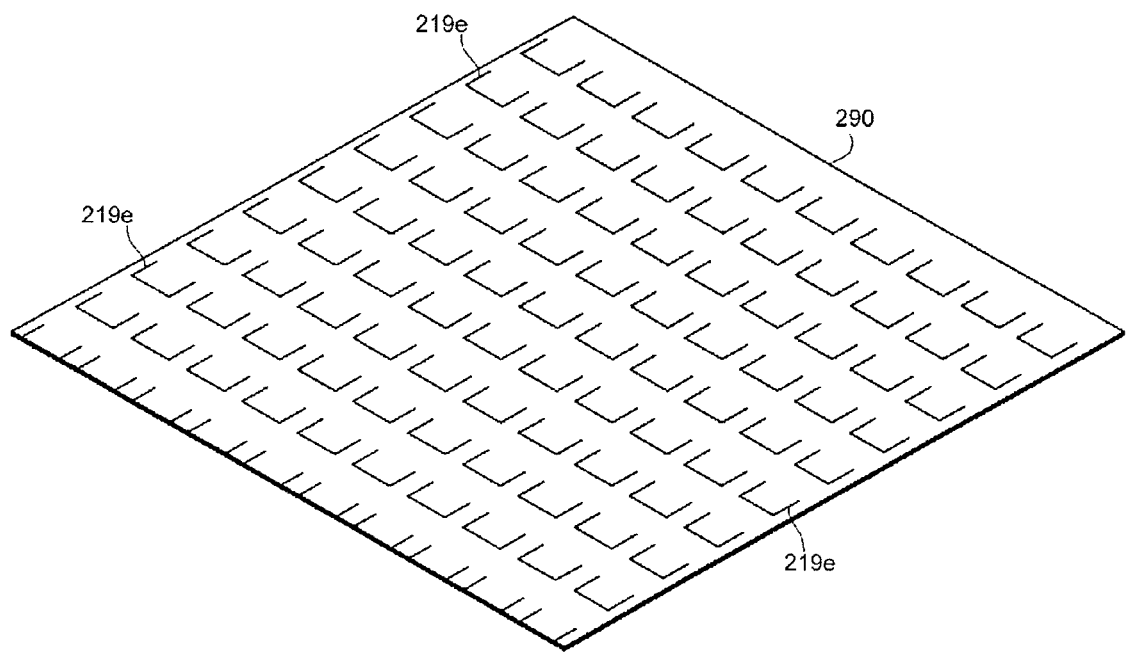
FIG. 11 is a perspective view of a flat metal member 290 according to modification 1.

Since the connector abutment portion 219a is located opposite the single cell abutment portion 219b, reference numeral 219a is not shown in FIG. 10.

The current collector 219 may be formed of, in place of the aforementioned plate material, for example, porous Ni, Ni mesh, or Ni wire. Alternatively, the current collector 219 may be formed of, in place of Ni, an oxidation-resistant metal such as an Ni alloy or stainless steel.

About several tens to one hundred current collectors 219 are provided in a fuel chamber 117 (the number of the current collectors may vary in association with the size of the fuel chamber).

As shown in FIG. 12, the flat insulation member 250 has a spacer 258, a flow direction changing portion 261, and a spacer connection portion 259, which are integrally formed.

The spacer 258 is provided between the connector abutment portion 219a and the single cell abutment portion 219b, and exhibits elastic force in a thickness direction. As shown in FIG. 6, the downstream-side ends of the in-line spacers 158 are discontinuous. In contrast, as shown in FIG. 12, the downstream-side ends of the in-line spacers 258 are continuous and form a straight line.

The flow direction changing portion 261 of the flat insulation member 250 projects between the connector abutment portion 219a and the single cell abutment portion 219b. Similar to the case of the flow direction changing portion 161, the flow direction changing portion 261 changes the flow direction of a fuel gas flowing from a buffer chamber 160 into the fuel chamber 117, whereby the fuel gas flows uniformly in the fuel chamber 117.

The spacer connection portions 259 forming the flat insulation member 250 connect a plurality of the spacers 258 together.

From the viewpoint of preventing bonding between the connector abutment portion 219a and the single cell abutment portion 219b, the material of the flat insulation member 250 may be any one species or a combination of a plurality of species selected from among mica, alumina felt, vermiculite, carbon fiber, silicon carbide fiber, and silica. When the flat insulation member 250 is formed of a stacking structure of thin plates (e.g., mica), appropriate elasticity can be secured with respect to a load in a stacking direction.

(Modifications 2 to 5)

FIGS. 13 to 16 schematically show fuel cells (cell units 103b to 103e) according to modifications 2 to 5 of the present invention, respectively. Each of the cell units 103b to 103e of modifications 2 to 5 includes a single fuel supply communication portion (gas inlet port) 140 (or a single fuel discharge communication portion (gas outlet port) 144).

Figure 13:
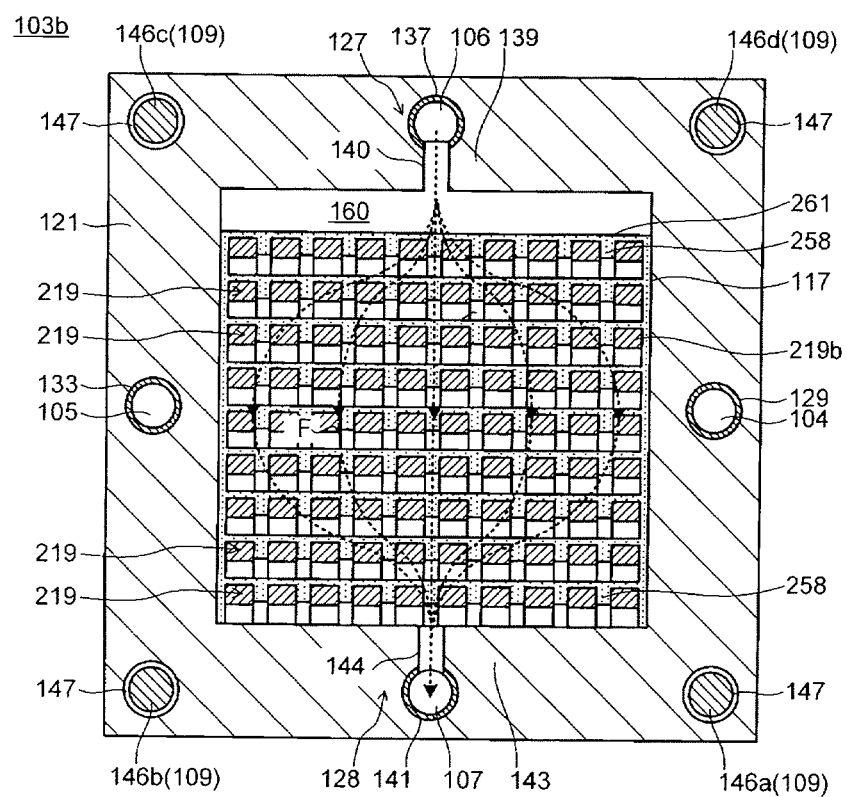
FIG. 13 is a schematic representation of a cell unit 103b according to modification 2.
Figure 14:
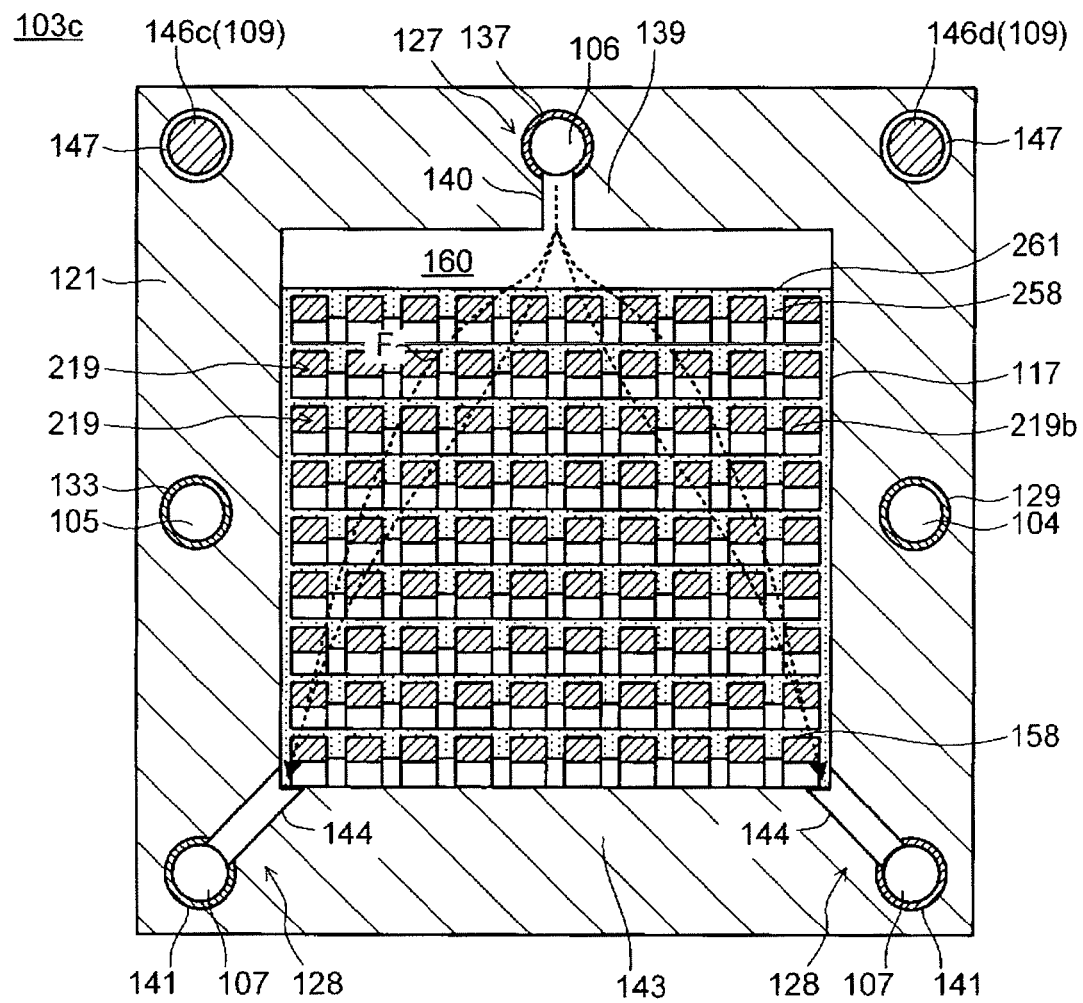
FIG. 14 is a schematic representation of a cell unit 103c according to modification 3.

Each of the cell units 103b and 103c shown in FIGS. 13 and 14 includes a single fuel supply communication portion (gas inlet port) 140.

Figure 15:
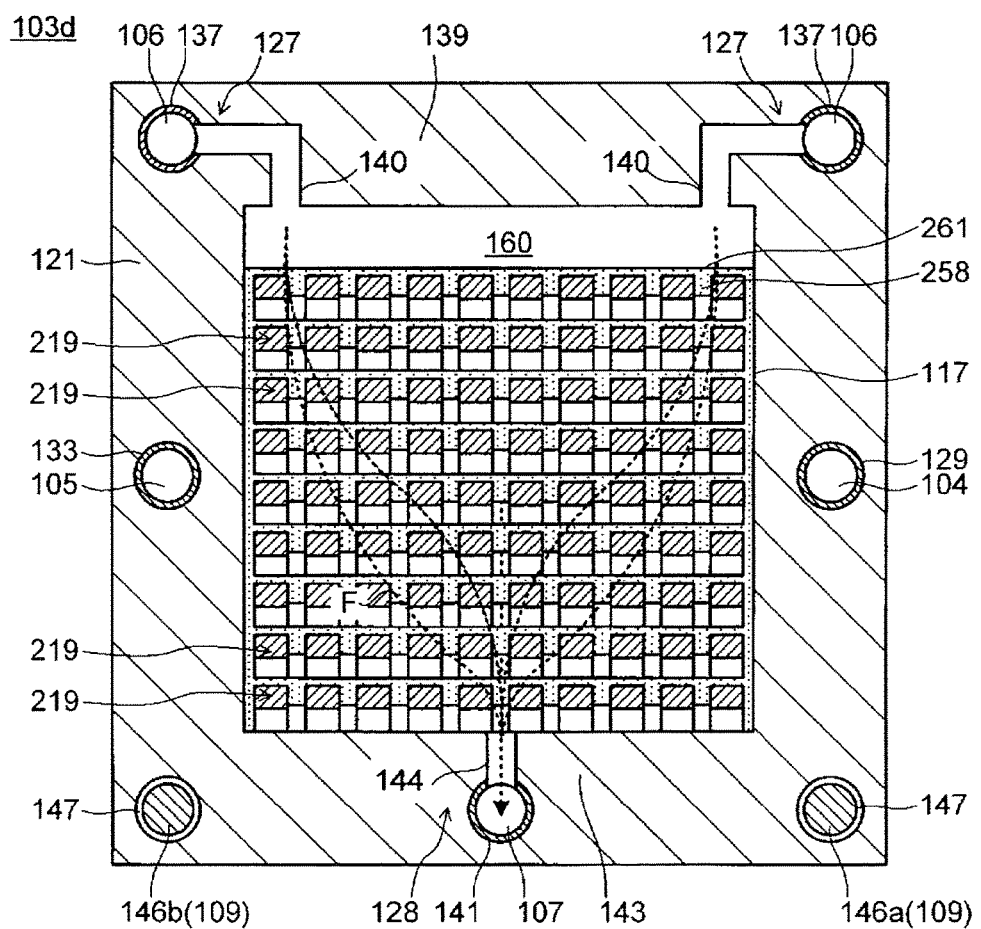
FIG. 15 is a schematic representation of a cell unit 103d according to modification 4.
Figure 16:
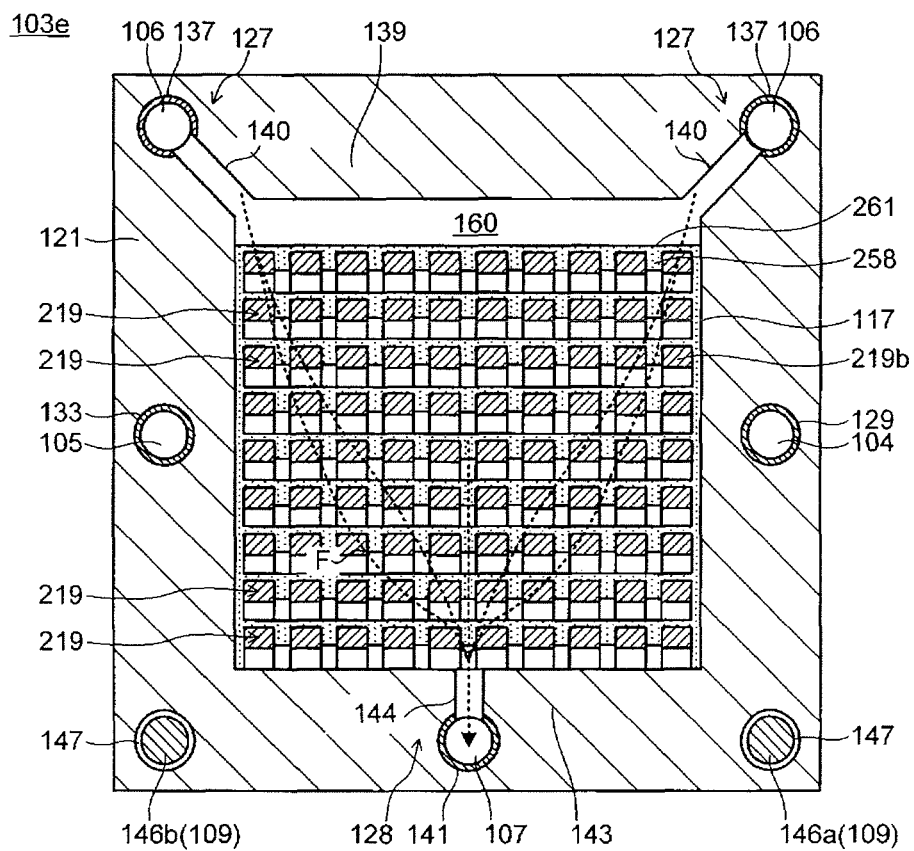
FIG. 16 is a schematic representation of a cell unit 103e according to modification 5.

Meanwhile, each of the cell units 103d and 103e shown in FIGS. 15 and 16 includes a single fuel discharge through hole (gas outlet port) 141.

Thus, even when a plurality of the fuel supply communication portions (gas inlet ports) 140 (or a plurality of the fuel discharge through holes (gas outlet ports) 141) are not provided, the flow direction changing portion 261 changes the flow direction of a fuel gas flowing from the buffer chamber 160 into the fuel chamber 117, whereby the fuel gas can flow uniformly in the fuel chamber 117.

In these modifications, the current collector 219 (having the flow direction changing portion 261) is employed in the fuel chamber 117. However, the current collector 119 (having the flow direction changing portion 161) may be employed in the fuel chamber 117.

Other Embodiments

Embodiments of the present invention are not limited to those described above and may be expanded and modified. The thus-expanded and modified embodiments are also included in the technical scope of the present invention.

In the aforementioned embodiments, the fuel supply communication portion (gas inlet port) 140 is provided on the anode insulation frame 121 (insulative frame member). However, the fuel supply communication portion (gas inlet port) 140 may be provided on the anode frame (electrically conductive (metallic) frame member).

Experimental Example

An experimental example of the present invention will next be described. As described above, an object of the present invention is to achieve uniform gas diffusion in a power generation region. In the present experimental example, there was determined the relationship between height ratio R and in-plane flow distribution error E.

Figure 17:
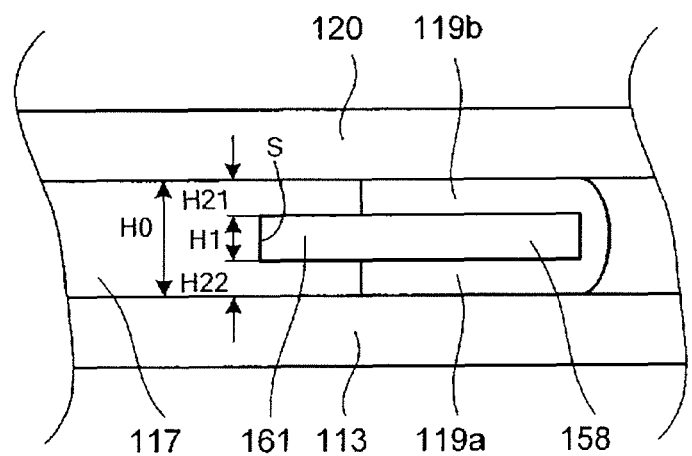
FIG. 17 is a cross-sectional view showing the relationship between the height H0 of a fuel chamber 117 and the thickness H1 of a flow direction changing portion 161.

As used herein, "height ratio R" refers to the ratio of the thickness H1 of the flow direction changing portion 161 (i.e., the height of one side surface S facing the fuel supply communication portions 140) to the height H0 of the fuel chamber 117; i.e., R=(H1/H0). As shown in FIG. 17, the current collector 119 (the connector abutment portion 119a and the single cell abutment portion 119b) and the flow direction changing portion 161 (integrated with the spacer 158) are provided in the fuel chamber 117. There may be the case where a gap SP (not illustrated) is present between the single cell abutment portion 119b and the spacer 158.

The aforementioned thicknesses satisfy the following relations:

$$H0 = H1 + H21 + H22 + H3$$
$$= H1 + H2 + H3$$

H0: height of the fuel chamber 117;
H1: thickness of the flow direction changing portion 161 (height of the side surface S facing the fuel supply communication portions 140);
H21: thickness of the connector abutment portion 119a;
H22: thickness of the single cell abutment portion 119b;
H2 (=H21+H22): thickness of the current collector 119; and
H3: thickness of the gap SP.

In the present experimental example, the flow path height H0 was adjusted to 1.2 mm, the current collector height H2 was adjusted to 0.7 mm, and the thickness H1 of the flow direction changing portion 161 was varied to 0 mm, 0.25 mm, or 0.5 mm. In this case, the thickness H3 of the gap SP (not illustrated) becomes 0.5 mm, 0.25 mm, or 0 mm, and the height ratio R becomes 0, 0.21, or 0.42.

As used herein, "in-plane flow distribution error E" refers to a variation in flow rate at a position immediately upstream of the flow direction changing portion 161 (specifically, at a position 0.5 mm upstream of the flow direction changing portion 161) in the fuel chamber 117. In-plane flow distribution error E is represented by the following formula:

$$E=(Fmax-Fmin)/Fmin$$

Fmax: maximum flow rate at immediately upstream of the flow direction changing portion 161, and
Fmin: minimum flow rate at immediately upstream of the flow direction changing portion 161.

Figure 18:
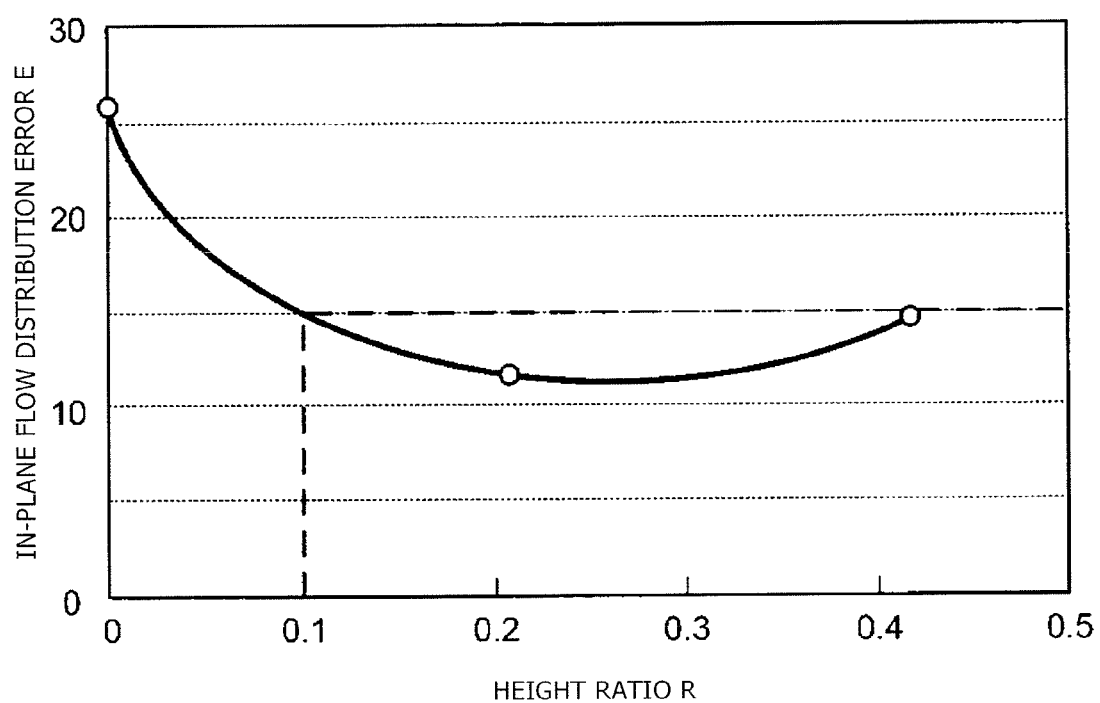
FIG. 18 is a graph showing the relationship between height ratio R and in-plane flow distribution error E.

As shown in FIG. 18, in-plane flow distribution error E depends on height ratio R. When height ratio R is excessively low, in-plane flow distribution error E is large. Specifically, when buffering performance is excessively high, an increased amount of a fuel gas flows at the edge of the single cell 120 in the vicinity of the fuel supply communication portion 140, and in-plane flow distribution error E tends to become large. Meanwhile, when height ratio R increases to some extent, in-plane flow distribution error E decreases. When height ratio R further increases, in-plane flow distribution error E increases to some extent. However, even when height ratio R becomes maximum (gap thickness H3=0), in-plane flow distribution error E remains at 15%.

In order to secure uniform gas diffusion in a power generation region, in-plane flow distribution error E is preferably adjusted to be 15% or less. As is clear from FIG. 18, this can be realized by adjusting height ratio R to 0.1 or higher.

DESCRIPTION OF REFERENCE NUMERALS

100: fuel cell stack
102: electrolyte
103: cell unit
104: air supply path
105: air discharge path
106: fuel supply path
107: fuel discharge path
109: fixing member
112, 113: interconnector
114: cathode
115: anode
116: air chamber
117: fuel chamber
118: current collector
119, 219: current collector
119a, 219a: connector abutment portion
119b, 219b: single cell abutment portion
119c: communication portion
119d: connection portion
120: single cell
121: anode insulation frame
122: anode frame
123: separator
124: cathode insulation frame
125: air supply unit
126: air discharge unit
127: fuel supply unit
128: fuel discharge unit
129: air supply through hole
130: air supply communication chamber
131: partition wall
132: air supply communication portion
133: air discharge through hole
134: air discharge communication chamber
135: partition wall
136: air discharge communication portion
137: fuel supply through hole
138: fuel supply communication chamber
139: partition wall
140: fuel supply communication portion
141: fuel discharge through hole
142: fuel discharge communication chamber
143: partition wall
144: fuel discharge communication portion
145a, 145b: end plate
146a to 146d: clamping member
147: corner hole
150, 250: flat insulation member
158, 258: spacer
160: buffer chamber
161, 261: flow direction changing portion
190, 290: flat metal member
219e: pre-cut line
259: spacer connection portion

What is claimed is:

1. A fuel cell comprising:
   a plate-like interconnector having a front surface and a back surface;
   a single cell having a power generation function;
   a fuel chamber provided between the interconnector and the single cell;
   one or more gas inlet ports for causing a fuel gas to flow into the fuel chamber;
   a buffer chamber provided between the one or more gas inlet ports and the fuel chamber;
   a flow direction changing portion provided between the buffer chamber and the fuel chamber so as to be corresponding to the one or more gas inlet ports, the flow direction changing portion having at least one of a front surface and a back surface, and a side surface;
   a fuel gas path provided on at least one of the front surface and the back surface of the flow direction changing portion; and
   a current collector which is provided in the fuel chamber and which is electrically connected to the interconnector and the single cell, the current collector comprising:
   a first electrically conductive member;
   a spacer provided on the first electrically conductive member; and
   a second electrically conductive member provided on the spacer and electrically connected to the first electrically conductive member, wherein the flow direction changing portion is integrated with the spacer,
   wherein
   the side surface of the flow direction changing portion is generally perpendicular to a flow direction of the fuel gas flowing through the one or more gas inlet ports such that the fuel gas flowing through the one or more gas inlet ports collides with the side surface; and
   a width of the spacer in the flow direction changing portion is greater than a width of the current collector such that the fuel gas flows through spaces at outer sides of the current collector.

2. The fuel cell according to claim 1, wherein the side surface of the flow direction changing portion faces the one or more gas inlet ports.

3. The fuel cell according to claim 1, wherein the one or more gas inlet ports, the flow direction changing portion, and the current collector are arranged substantially in a common plane.

4. The fuel cell according to claim 3, wherein the flow direction changing portion is integrated with the current collector.

* * * * *